July 5, 1955  E. C. RANEY  2,712,579
CONTROL APPARATUS
Filed Jan. 20, 1954  2 Sheets-Sheet 1

INVENTOR.
ESTEL C. RANEY
BY Roy C. Raney
ATTORNEY

July 5, 1955

E. C. RANEY 2,712,579

CONTROL APPARATUS

Filed Jan. 20, 1954

INVENTOR.
ESTEL C. RANEY
BY
ATTORNEY

United States Patent Office 2,712,579
Patented July 5, 1955

2,712,579

CONTROL APPARATUS

Estel Coles Raney, Fort Lauderdale, Fla., assignor to Ranco Incorporated, Columbus, Ohio, a corporation of Ohio Application January 20, 1954, Serial No. 405,164

4 Claims. (Cl. 200—140)

The present invention relates to control apparatus comprising an electric switch operated by a spring loaded pressure expansible element arranged to actuate the switch to one position at one predetermined pressure and to actuate the switch to a second position at another pressure, manually adjustable means being provided to readily vary over a relatively wide range the pressures at which the switch is actuated to one position while the pressure at which the switch is actuated to the other position remains unchanged. While the apparatus may be used to control any temperature controlling mechanism, it is particularly suitable for controlling the operation of refrigerating apparatus in which it is desired to initiate the refrigerating cycles when the temperature in the cooling unit rises to a predetermined degree above the melting point of frost and to terminate the refrigerating cycle at a lower temperature which may be selectively varied within a given range.

An object of the invention is to provide a control apparatus of the character referred to comprising a housing or frame having one wall forming a panel in which a rotatable manual adjusting knob is journaled, a spring loaded switch operating lever pivoted in the housing and extending alongside the wall and movable toward and from the wall to operate a switch in the housing, and a cantilever leaf spring interposed between the lever and wall and engaged by the lever during a part of its movement to counteract, to a limited degree, the spring load which is constantly acting on the lever and thereby control the temperatures at which the switch is operated for one phase of control, the position of the leaf spring being variable by the manually rotatable adjusting mechanism to change the resistance thereof to movement of the switch operating lever.

Other objects and advantages of the invention will be apparent from the following description of a preferred embodiment of the invention, reference being made to the accompanying drawings wherein.

Figure 1:
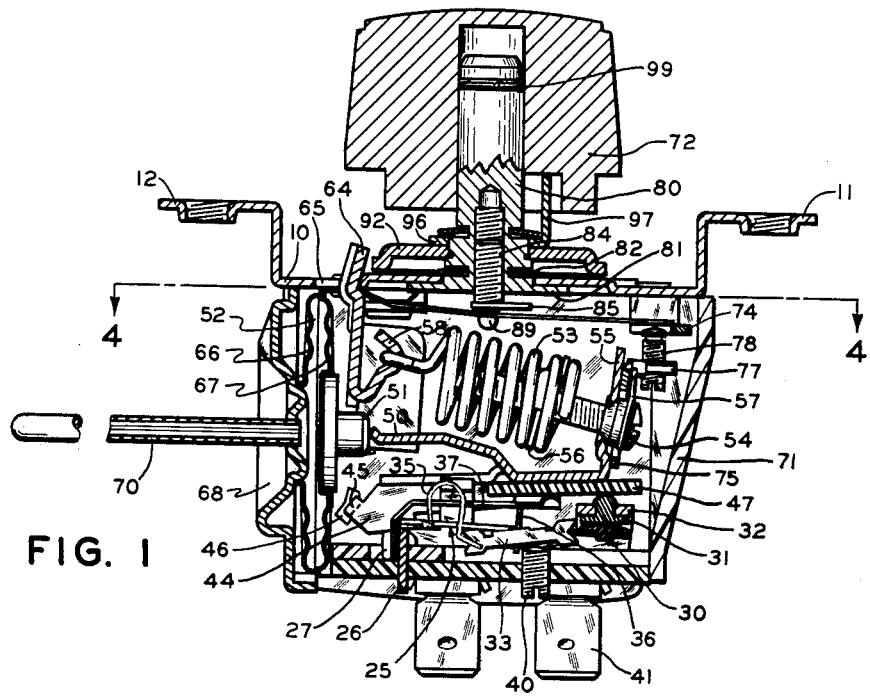
Fig. 1 is a cross-sectional view of a control apparatus embodying the invention.

As mentioned previously, the control apparatus shown is particularly suitable for controlling the operation of the compressor of an electric refrigerator and it comprises in general a snap switch mechanism operated to its closed position by the expansion of an expansible thermal element responsive to the evaporator temperature of the refrigerator and operated in the opposite direction by a helical spring arranged to oppose movement of the expansible element. The spring is connected with the expansible element through a lever which is moved by the expansible element to actuate the switch and the lever extends generally parallel to the axis of the spring, one end of the lever being arranged to engage a leaf type cantilever spring, which extends generally parallel with the lever and the tension spring, and which leaf spring is adapted to counteract, to a limited extent, the tension of the first mentioned spring on the expansible element during a part of the movement of the lever toward one of the switch operating positions. The leaf spring lies adjacent to one wall of a housing enclosing the control apparatus and its tension as to lateral deflection is adjustable by a manual rotatable element attached to the housing wall. By this arrangement the control apparatus can be extremely compact, thereby minimizing its cost and the space in the refrigerator required to accommodate the same.

In the embodiment of the invention shown, the housing for the control comprises a relatively heavy face plate 10, the ends of which have offset lug portions 11, 12 which are preferably provided with threaded openings by which the control apparatus can be attached to a suitable panel in a refrigerator by screws or the like which are not shown. Two opposed side plates 14, 15 are attached to the plate 10 adjacent to opposite side edges thereof by screws 16 extended through openings in the plate 10 and threaded into suitable lugs 16' formed at one end on the side plates and extending inwardly at right angles thereto, and two in-turned lugs 17 on the side plates at the opposite end thereof, which lugs are inserted through openings 18 in the plate 10 and overlie portions 19 of the plate 10 adjacent to the openings 18. In assembling the control the lugs 17 are first inserted through the openings 18 and the side plates shifted to bring the lugs over the portions 19 before the screws 16 are threaded in place.

The side of the housing opposite the plate 10 is closed by a two ply panel 21 which is preferably formed of a suitable rigid dielectric material, such as Bakelite, and which is supported by the sides 14, 15 by lugs 22 formed on the panel adjacent to the four corners thereof and which project into openings formed in the side plates. The panel 21 is assembled in the housing merely by spreading the sides 14, 15 and inserting the lugs 22 in their respective openings, the inherent spring of the walls holding the lugs in the openings.

The panel 21 carries a suitable snap switch mechanism indicated generally at 24, and in the form shown this switch is like that described and claimed in my Patent No. 2,556,981. The switch mechanism includes a leaf spring 25, which is attached at one end to a bracket 26 by a rivet 27, having a contact 30 at the free end thereof, which contact is arranged to engage a fixed contact 31 attached to an inverted U-shaped terminal member 32 suitably secured to the panel 21. The free end of spring 25 is arranged to be snap actuated toward and from contact 31 by a link 33 which moves in a longitudinally extending opening 34 in the spring and which has one end pivotally connected to the spring at one end of the opening by a V bearing formed in the end of the link. The opposite end of the link is similarly pivoted to one end of a C-shaped spring 35 which has its other end pivoted to the left hand end edge of the opening 34. The link 33 extends through a stirrup 36 formed on an actuator member 37 which is formed of a U-shaped flat spring having the ends of the leg portions riveted to the bracket 26 as shown. The actuator 37 is inherently biased upwardly, as viewed in Figs. 1 and 2, which raises the link 33 and causes it to hold the spring 25 in the contact opening position shown in Fig. 2. As the actuator 37 is lowered, link 33 pivots about the end of a screw 40 threaded through the panel 21 and is moved through a dead center position relative to the spring 35 and the pivots for the spring and link so that the spring then causes the link to shift to the position shown in Fig. 1 and snap move spring 25 to close contact 30 on contact 31.

When contacts 30, 31 are closed an electrical circuit for a refrigerator motor, for example, may be established through a terminal 41, which is integral with terminal member 32, contacts 31, 30, spring 25, bracket 26 to terminal 42 which is integral with bracket 26. The motor circuit is not shown.

Any other suitable switch mechanism could be employed if desired.

The actuator 37 is moved by a lever 44 which is preferably formed by a U-shaped stamping having the ends of its legs provided with out-turned lugs 45 projecting into openings 46 in the sides 14, 15 and pivoted to the edges of the openings to provide knife edge bearings. The lever 44 has a dielectric plate 47 attached thereto by lugs 48 formed on the lever and the plate 47 is engaged by the actuator member 37, the inherent upward bias of which actuator member causes it to maintain engagement with the plate.

The lever 44 has a tongue 50 formed thereon, the outer end of which rests on a post 51 attached to the outer wall of an expansible thermal element 52. The element 52 is adapted to expand and thereby move the lever 44 clockwise, as viewed in Figs. 1 and 2 and cause the switch contacts 30, 31 to be closed, as described hereinbefore.

Figure 2:
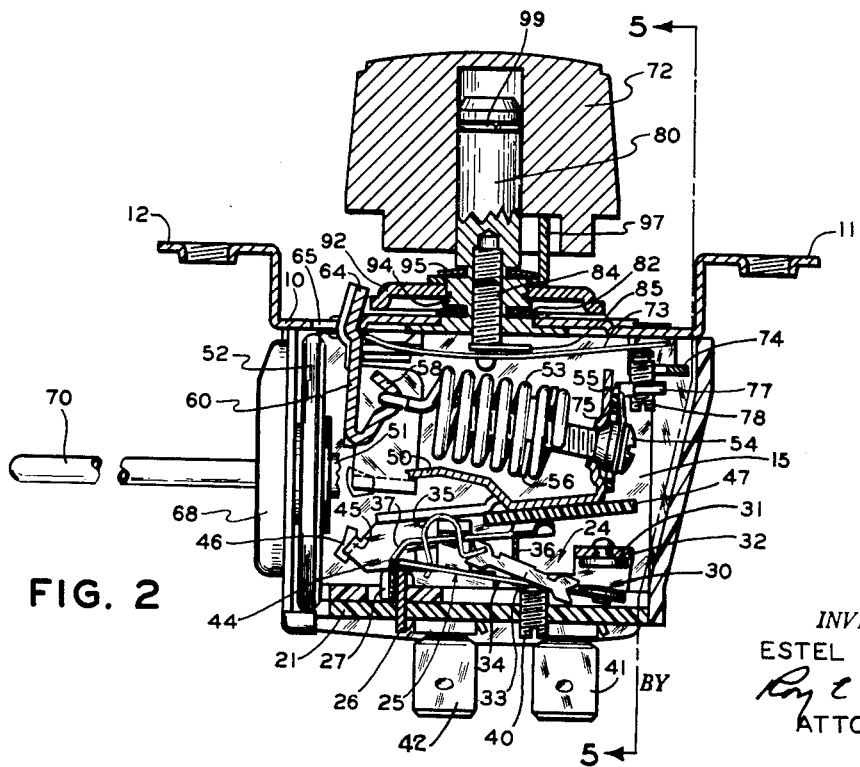
Fig. 2 is a view similar to Fig. 1 but showing the switch mechanism of the control in a different position.

The clockwise movement of lever 44 is opposed by a helical tension spring 53 attached to one end of the lever 44 by a screw 54 rotatably carried in an opening in a turned portion 55 of the lever 44. The spring 53 is attached to the screw 54 by a plate 56 threaded on the screw and received between the end convolutions of the spring. The opposite end of the spring 53 has a hook formation which is engaged with a hook 58 formed on a generally U-shaped lever 60 pivoted to the opposite side walls 14, 15 by lugs 61, 62 which are formed at the ends of the legs of the lever and which are pivoted in openings in the side walls similarly to lever 44. The legs of the lever 60 straddle the post 51 of the thermal element 52, as seen in Figs. 1 and 2, and the outer end of the lever has a finger 64 which projects through a slot 65 through the plate 10. The tension of spring 53 urges the finger 64 to the right end of the slot 65, as seen in Figs. 1 and 2.

The thermal element 52 comprises two dish-shaped corrugated flexible metal members 66, 67 brazed together about the peripheries thereof. The member 66 has a central opening, the edges of which are turned out in the form of a neck which is brazed to a central circular ridge formation on a plate 68. The post 51 is brazed to the outside of member 67. One end of a tube 70 is brazed to the walls of a central opening in the plate 68 and the tube and the outer end of the tube is sealed. The tube 70 and element 52 contain a suitable temperature responsive vapor, such as methyl chloride, and the tube is adapted to be secured in heat exchange relation with the evaporator of the refrigerator to be controlled, as is commonly understood in the art, so that the expansible element or wafer formed by the members 66, 67 expands and contracts by changes in vapor pressure which corresponds to the temperature of the coldest part of the tube as is well understood in the art.

The plate 68 is received in one end of the housing and is secured by in-turned flanges 69 formed at the ends of the side plates 14, 15 so that the plate forms an end wall of the housing. The opposite end of the housing is closed by a molded wall 71 secured to the housing by flanges 71' at the ends of the side plates 14, 15. The general arrangement of the control components with the housing thus far described, as well as certain other features, is described and claimed in my U. S. Patent 2,670,417.

In the form of control apparatus shown, the tension of the spring 53 is set at the factory by rotating the screw 54 in one direction or the other and thereby move the plate 56 along the screw to provide the spring tension required to cause the switch to be closed at a predetermined temperature desired, which corresponds to the pressure within the thermal element 52. A hairpin shape spring 57 is engaged in a groove about the screw to frictionally resist unintentional turning thereof, one leg of the spring having a hook which is lodged in a V formed on a lug 57' of the part 55 of lever 44 to prevent rotation of the spring. The user of the refrigerator cannot readily adjust the screw 54.

In a preferred use of the control it is desirable to cause the temperature in the evaporator of the refrigerator to rise to 36° F., or thereabout, before each refrigerating cycle is initiated to insure defrosting of the refrigerator cooling unit each cycle of operation, and in order to provide for adjustment of the mean evaporator temperatures the temperatures at which the switch is opened may be varied by rotation of a knob 72 mounted on the exterior of the housing plate 10. The temperatures at which the switch opens is determined by the load on the thermal element 52 at the time the lever 44 reaches the switch opening position and this load is variably controlled, within limits, by providing a leaf spring 73 which is attached at one end to the plate 10 by rivets 73', and which extends generally parallel to the spring 53 and lever 44. The outer end of the spring 73 extends over the yoke of a U-bracket 74 having the ends of its legs staked in openings through the plate 10, and the spring is continually biased downwardly so that the yoke of the bracket forms a stop for limiting downward movement of the spring. The spring 73 is arranged to be lifted or laterally deflected from its stop by the lever 44 as the latter approaches the switch opening position, whereby the resistance of the spring 73 to deflection counteracts to a limited extent the load imposed on the thermal element by the spring 53.

The engagement between lever 44 and spring 73 is effected by a plate 75 attached to the upturned portion 55 of the lever 44 by ears 76 turned into notches formed on opposite sides of the upturned portion of the lever. The plate 75 has a lug 77 formed thereon which has a threaded opening receiving a screw 78, the upper end of which is arranged to engage the underside of the spring 73 when the lever 44 is rotated clockwise by the spring 53 following a reduction in pressure in the thermal element 52. The screw 78 is rotated to adjust the position of the lever 44 at which spring 73 is engaged and this adjustment is made during the manufacture of the control apparatus so that the spring 73 will be out of contact with lever 44 when the lever moves to the switch closing position.

As mentioned hereinbefore, the user of the refrigerator on which the control apparatus is applied may vary the tension of the spring 73 by rotating the knob 72. The knob 72 is attached to a rotatable shaft 80 journaled in an opening through wall 10 and having an end flange 81 on the inner side of plate 10, which flange is held to the wall by a spring in a groove in the shaft and urging the shaft upwardly. The inner end of the shaft is bored and threaded to receive a screw 84 therein, which screw has a plate 85 rigidly secured thereto. The plate 85 and screw 84 are prevented from rotating with the shaft 80 by a down-turned lug 88 at one side of the plate which is received in a notch in the side of the spring 73 whereby the lug engages opposite edges of the notch when the plate 85 tends to rotate in either direction. It will be seen that by rotating the knob 72 the screw 84 will move up or down, as viewed in Figs. 1 or 2. The underside of plate 85 has a blister 89 which engages the spring 73 and depresses the spring more or less according to the vertical adjustment of screw 78, as described. The lower the plate 85 is moved, the greater is the tension of spring 73 in opposition to the upward movement of lever 44. Thus, the opening temperature of the control switch can be selectively adjusted while the switch closing temperature remains constant.

Figure 4:
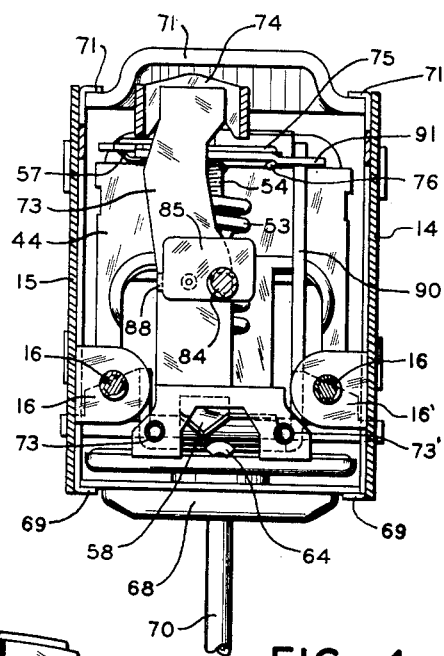
Fig. 4 is a sectional view taken substantially along line 4—4 of Fig. 1.
Figure 5:
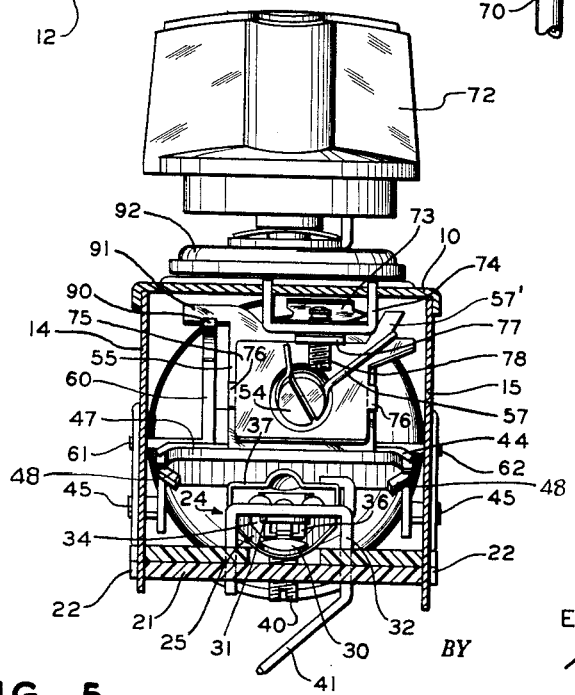
Fig. 5 is a sectional view taken substantially along line 5—5 of Fig. 2.

In the control apparatus shown, the switch 24 can be maintained open by turning the knob 72 to one extremity of its movement. This switch control is effected through the lever 60 which has an arm 90, best seen in Fig. 4, the outer end portion of which lies beneath a lateral projection 91 formed on the up-turned portion 55 of lever 44. A cam 92 is secured to the shaft 80 by meshing teeth formations on the cam and shaft similar to those indicated at 93, the teeth being held in mesh by the cam resting on a shoulder 94 and held thereto by a lock washer 95. A driver plate 96 having an upturned lug 97 is keyed to the shaft 80 by the teeth 93 and is secured in place by the lock washer 95. The lug 97 extends into a recess in the knob 72 to drivingly connect the knob with the driver plate. The knob 72 is frictionally held to the post by an expander ring 99 located in a groove about the outer end of the shaft 80.

The periphery of the cam 92 is normally out of range of the finger 64 of the lever 60 so that the lever is unmoved during normal adjustment of the spring 73 by the rotation of the knob 72. A rise 102 is provided on the cam which is adapted to force the finger 64 outwardly relative to the shaft 80 and thereby rotate lever 60 counterclockwise and cause the arm 90 thereof to engage the projection 91 and force lever 44 counterclockwise against the thermally responsive element 52 and move the switch to its open position where it is maintained irrespective of the vapor pressure increase in the element 52.

Figure 3:
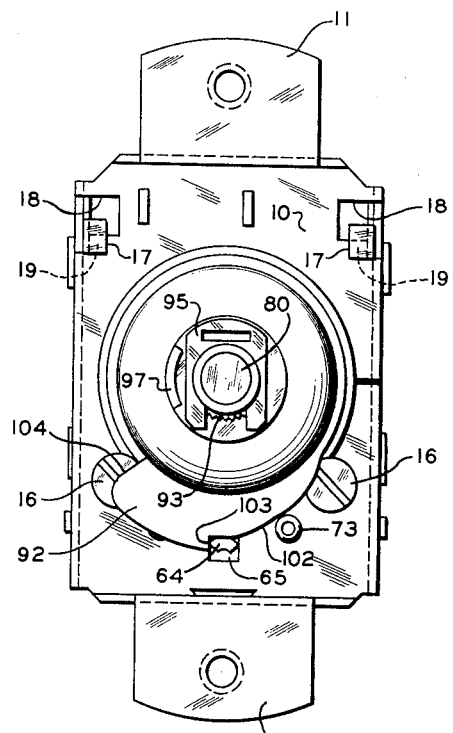
Fig. 3 is a plan view of the control apparatus with the adjusting knob removed.

The cam 92 has a step 103 at one end of the rise 102 which cooperates with the edge of the finger 64 to form a stop to limit rotation of the knob 72 in the counterclockwise direction, as viewed in Fig. 3, and a step 104 several degrees from the step 103 is adapted to engage the opposite edge of the finger to limit rotation of the knob in the opposite direction.

By the construction shown, mechanism is provided for bringing a second temperature range spring into action during one cycle of operation of the control apparatus which mechanism occupies a minimum of space and which can be readily assembled and adjusted.

While but one form of the invention has been described, it is to be understood that other forms could be adopted falling within the scope of the following claims.

I claim:

1. A control apparatus comprising a housing, a switch supported by said housing, a lever pivoted in said housing and operative to open and close said switch when the lever is moved about its pivot in opposite directions to first and second positions, a spring urging said lever in one direction about its pivot, a pressure expansible element operative to urge said lever in a direction opposite the first mentioned direction, a cantilever spring member extending alongside one wall of said housing and having its unsecured end engageable by said lever during movement from one of said positions to the other and to yieldingly resist movement of said lever toward said other positions, and a stop to limit movement of said spring toward said one position of said lever.

2. A control apparatus comprising a housing, a switch supported by said housing, a lever pivoted in said housing and operative to open and close said switch when the lever is moved about its pivot in opposite directions to first and second positions, said lever extending generally parallel with one wall of the housing, a spring urging said lever in one direction about its pivot, a pressure expansible element operative to urge said lever in a direction opposite the first mentioned direction, a flat cantilever spring member extending alongside said one wall of said housing and lying in a plane substantially parallel to and intermediate said wall and lever and having its unsecured end engageable by said lever during movement of said lever toward said other positions, and a stop to limit movement of said spring toward said one position of said lever.

3. A control apparatus comprising a housing, a switch supported by said housing, a lever pivoted in said housing and operative to open and close said switch when the lever is moved about its pivot in opposite directions to first and second positions, a spring urging said lever in one direction about its pivot, a pressure expansible element operative to urge said lever in a direction opposite the first mentioned direction, a cantilever spring member extending alongside one wall of said housing and having its unsecured end engageable by said lever during movement from one of said positions to the other and to yieldingly resist movement of said lever toward said other positions, means to adjustably deflect said cantilever spring toward said lever, and a stop to limit movement of said spring toward said one position of said lever.

4. A control apparatus comprising a housing, a switch supported by said housing, a lever pivoted in said housing and operative to open and close said switch when the lever is moved about its pivot in opposite directions to first and second positions, a spring urging said lever in one direction about its pivot, a pressure expansible element operative to urge said lever in a direction opposite the first mentioned direction, a flat cantilever spring member extending alongside one wall of said housing and having its unsecured end engageable by said lever during movement from one of said positions to the other and to yieldingly resist movement of said lever toward said other positions, means including a rotatable screw device for deflecting the intermediate portion of said cantilever spring, and a stop to limit movement of said spring toward said one position of said lever.

References Cited in the file of this patent

UNITED STATES PATENTS

| | | |
|---|---|---|
| 2,511,640 | Kuhn | June 13, 1950 |
| 2,670,417 | Raney | Feb. 23, 1954 |